United States Patent [19]

Stumpf et al.

[11] E Re. 30,278

[45] Reissued May 20, 1980

[54] SPECIAL EFFECTS GENERATION AND CONTROL SYSTEM FOR MOTION PICTURES

[75] Inventors: Richard J. Stumpf, Woodland Hills; Waldon O. Watson, Universal City; Robert J. Leonard, Northridge, all of Calif.

[73] Assignee: MCA Systems, Inc., Universal City, Calif.

[21] Appl. No.: 907,838

[22] Filed: May 19, 1978

Related U.S. Patent Documents

Reissue of:

[64] Patent No.: 3,973,839
Issued: Aug. 10, 1976
Appl. No.: 5,3 7,194
Filed: Dec. 30, 1974

[51] Int. Cl.[3] ..... G03B 31/00

[52] U.S. Cl. ..... 352/5; 352/6; 352/7; 352/10; 352/25; 352/40; 352/85; 352/92; 179/1 AT

[58] Field of Search ..... 352/1, 3, 5, 6, 7, 8, 352/9, 10, 25, 40, 85, 92; 272/14; 179/1 AT, 1 R; 73/522, 555, 556, 571, 664; 181/101, 108, 113, 142; 35/12 Q; 340/384 R, 384 E; 331/78

[56] References Cited

U.S. PATENT DOCUMENTS

| | | | |
|---|---|---|---|
| 883,290 | 3/1908 | Burgess | 272/14 |
| 928,070 | 7/1909 | Rousselot | 352/1 |
| 1,005,061 | 10/1911 | Murie | 352/85 |
| 1,789,680 | 1/1931 | Gwinnett | 352/85 |
| 1,962,055 | 6/1934 | Cawley | 35/1 |
| 2,714,633 | 8/1955 | Fine | 179/100.1 |
| 2,768,236 | 10/1956 | Allison | 179/1 AT |
| 2,861,806 | 11/1958 | Disney | 352/85 |
| 3,414,873 | 12/1968 | Richard et al. | 179/1 R |
| 3,612,211 | 10/1971 | Clark | 181/142 |
| 3,826,566 | 7/1974 | Csontos | 352/92 |
| 3,907,412 | 9/1975 | Schaller et al. | 352/11 |
| 4,110,017 | 8/1978 | McCormack et al. | 352/5 |

FOREIGN PATENT DOCUMENTS

| | | |
|---|---|---|
| 1003759 | 1/1977 | Canada . |
| 1273969 | 9/1960 | France . |
| 336699 | 10/1930 | United Kingdom . |
| 432221 | 7/1935 | United Kingdom . |

OTHER PUBLICATIONS

"Sound in the Air", J. Stokley, *Science News Letter* May 17, 1941, pp. 314–316.

"Of Sound, Fury and Stevens Tech", *New York Times* Jul. 20, 1941.

"Thunder Screen for the Stage Imitates Gunfire or Crash", *Popular Mechanics*, pp. 556–557, Oct. 1940.

"Sensurround" American Cinematographer, Nov. 1974, p. 1312t.

*The Tuning of the World*, Schafer, Alfred A. Knopf, 1977, pp. 115–116.

*Hearing and Deafness*, Davis & Silverman, Holt, Rinehart and Winston, Inc., 1960, pp. 44–47.

*Sound in the Theater*, Burris-Meyer and Malbry, Radio Magazines Inc., 1959.

"New Sound System Gets First Test on Par 'StarTrek'" *Hollywood Reporter* Dec. 19, 1978.

*IEEE Standard Dictionary of Electrical and Electronic Terms* Wiley-Interscience, Second Edition, p. 331.

*Concise Dictionary of Physics* Pergamon Press, first edition, p. 300.

*The New Acoustics*, McLachlan, Oxford University Press 1936, pp. 6–7.

*The Acoustics of Buildings*, Davis & Kaye, G. Bell and Sons 1927, pp. 34–35.

"The Ultimate Amplifier", Cook & Jose, *High Fidelity*, Dec. 1954.

"Earthquakes on Disc", *The Audio Bucket*, vol. 1, No. 3, Apr. 1, 1955, Cook Laboratories.

*The Encyclopedia of Physics*, Van Nostrand Reinhold 1974, p. 18.

*Encyclopedia Dictionary of Electronics and Nuclear Engineering* Prentice-Hall, 1959, p. 631.

"Earthquake Sound System", Czerwinski & Lewis, *Audio*, Apr. 1975, pp. 46–52.

"Profiles", *The New Yorker*, Mar. 3 and 10, 1956.

Record jacket of recording titled "Out of This World", Cook Laboratories, Stanford, Conn., 1954.

*Sound A Physical Text Book,* E. G. Richardson, Longmans Green & Co. 1927.
"Infrasonics", R. W. B. Stephens, *Ultrasonics,* Jan. 1969, pp. 30–35.
"Infrasound", V. Gavreau, *Science Journal, Jan. 1968, pp. 33–37.*
"The Second Sound Show", theater program book from the Stevens Theater, Stevens Institute of Technology, Apr. 17, 1941.
"Theatrical Uses of the Remade Voice, Subsonics and Reverberation Control", Burris-Meyer, *JASA* vol. 13, No. 1, pp. 16–19, Jul. 1941.
"Sound Control Apparatus for the Theater", Burris-Meyer, *JASA,* vol. 12, pp. 122–126.
"Sound Control in the Theater Comes of Age", Burris-Meyer, *JSMPE,* Dec. 1943, pp. 500–504.
"Noises You Never Hear", E. E. Free, *Popular Science Monthly,* Aug. 1926, pp. 16–18.
"Effects of Low Frequency and Infrasonic Noise on Man", Aerospace Medicine, Sep. 1965, pp. 817–824.
"Sound Recording–From the Musician's Point of View", Stokowski, SMPTE, Feb. 1932, pp. 164–167.
"Doctor Wood", W. Seabrook, 1941 Harcourt Brace & Co., pp. 282–283.
"Movies on T.V., 1972–1973 Edition", p. 373.

*Primary Examiner*—Russell E. Adams
*Attorney, Agent, or Firm*—Fulwider, Patton, Rieber, Lee & Utecht

[57] ABSTRACT

A special effects system for simulating physical sensations in an audience during the presentation of a motion picture. Relatively high intensity, very low frequency random noise is acoustically coupled to a theater space to produce psychological and physiological sensations, much as earthquake movements, in the audience. The special effects are controlled by a control sub-channel which is either frequency multiplexed onto a conventional optical audio track or, in a magnetic stripe film format, the control sub-channel is placed on an accompanying optical track. The presence and amplitude of two control frequencies in the sub-channel are detected and logically combined, providing four separate digital function control signals and two analog control signals which are variable in amplitude.

47 Claims, 10 Drawing Figures

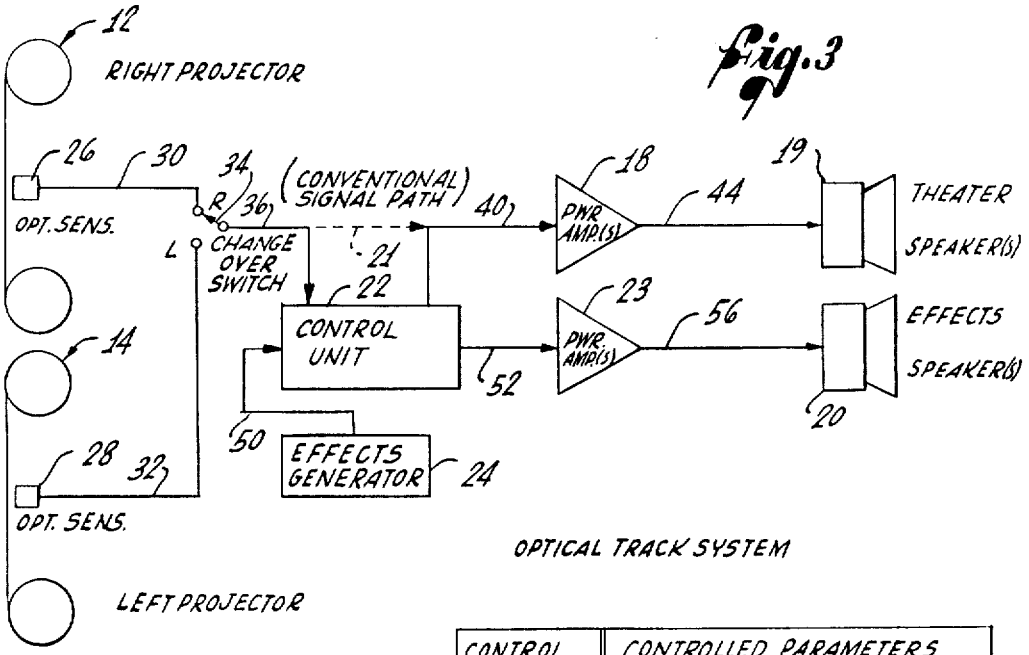
Fig. 3
OPTICAL TRACK SYSTEM
Fig. 2
| CONTROL SIGNALS | | CONTROLLED PARAMETERS | | | |
|---|---|---|---|---|---|
| | | PROGRAM CHANNEL | EFFECTS CHANNEL | | |
| A | B | PROGRAM STEP GAIN | EFFECTS ON | PROGRAM GAIN | EFFECTS GAIN |
| 0 | 0 | 0 | 0 | 0 | 0 |
| 1 | 0 | 0 | 1 | 1 | 0 |
| 0 | 1 | 0 | 1 | 0 | 1 |
| 1 | 1 | 1 | 1 | 1 | 1 |
Fig. 4
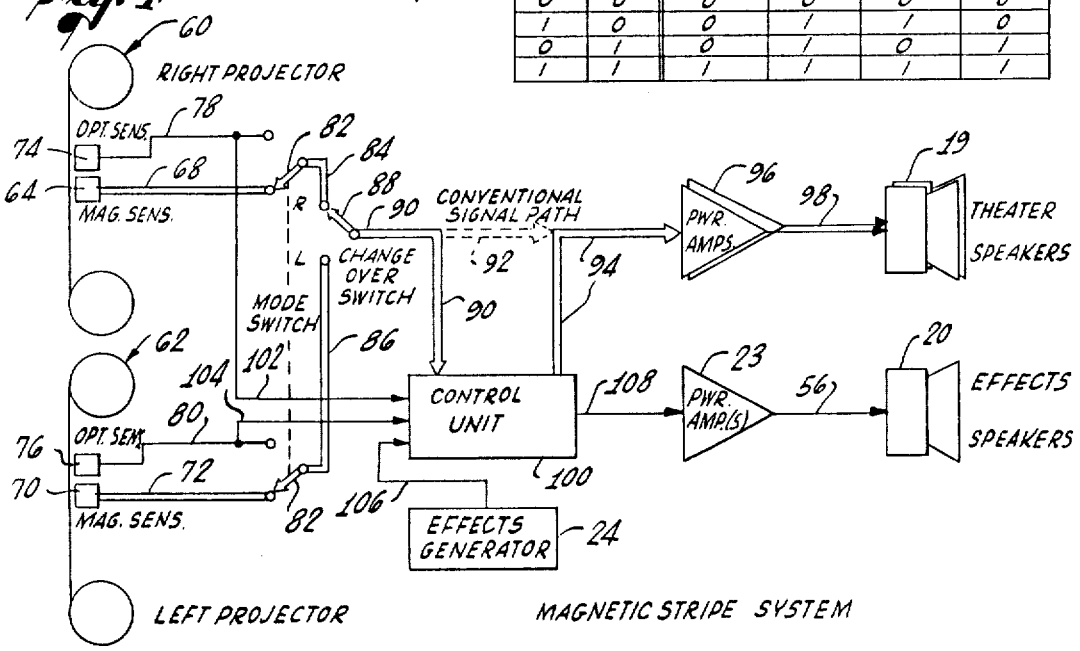
MAGNETIC STRIPE SYSTEM

SPECIAL EFFECTS GENERATION AND CONTROL SYSTEM FOR MOTION PICTURES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to motion picture special effects generation and control systems and, more particularly, to a system for simulating an effect such as an earthquake including a control sub-channel incorporated into an existing motion picture film format which produces multi-function analog and digital control signals.

2. Description of the Prior Art

A number of techniques have been proposed or utilized to produce special effects for motion picture theater audiences in addition to the conventional audio sound track. In those systems designed to produce a physical effect on the theater audience, the approach has heretofore been to provide a direct physical stimulus in the form of odors as represented, for example, by U.S. Pat. No. 1,749,187 or physical movement cued to the visual presentations such as vibrating seats or the like, as represented, for example, by U.S. Pat. No. 2,861,806. It will be appreciated that such systems require extensive modification of the theater in which they are installed or the theater must be specially built for such systems, such as with a vibrating floor or seats.

Some of these systems have been designed to be cued from special control tracks or notches on the motion picture film. Other systems have utilized analog control signals which are frequency multiplexed onto a magnetic or optical track such as, for example, the system described in U.S. Pat. No. 2,714,633. Typically, these special effects control systems require special reproduction equipment which is not compatible with ordinary motion picture projection equipment.

Thus, in the past, producing physical sensations in a theater audience has required elaborate theater equipment for direct physical stimulation. Additionally, such equipment was typically specially designed and incompatible with conventional motion picture film formats. There has therefore been a need for a special effects system which could produce physical sensations in an audience in a conventional theater when desired and still be compatible with conventional film formats and projecting equipment. The present invention satisfies that need.

SUMMARY OF THE INVENTION

The special effects generation and control system of the present invention provides for the stimulation of psychological and physiological sensations in a theater audience. In a presently preferred embodiment, very low frequency pseudorandom noise signals having sonic and infrasonic components are electroacoustically coupled to the theater space, *from transducers located within the theater space,* at a sufficiently high intensity to cause the sensation of experiencing physical movement such as an earthquake in an audience.

The system of the invention includes a multifunction control system which is substantially compatible with existing motion picture film formats and theater projectors. The control system is easily installed into existing theater audio systems by simple interruption of the conventional signal paths between audio sensors on the projectors and the theater amplifiers and speakers with a control unit. A separate effects generator is connected to the control unit to provide versatility in the type of effects which may be produced.

For the optical track format, the control system includes a control sub-channel which is frequency multiplexed onto the single optical track with the program audio signal. The optical track format is modified slightly to increase the opening time for the noise reduction device and the maximum program signal excursion is decreased by two decibels to insure the detectability of the control sub-channel. Alternatively, in a magnetic stripe format, a normally redundant optical track is utilized for direct control sub-channel recording.

In the presently preferred embodiment, the control sub-channel includes two low frequency signals which are amplitude modulated to provide two analog control voltages upon detection and the two control voltages are also logically combined to provide four separate digital function control signals. The analog voltages control the levels of the program and effects signals and the digital signals control their combination to provide the desired results.

In utilizing the system of the invention, use is also made of an editing or re-recording apparatus which substantially synchronizes the phase of a control signal generator with that of the control signals on a recording media so that the control signals may be edited without introducing abrupt changes in the control signal level due to phase mismatch.

Thus, the system of the invention produces simulated physiological sensations, particularly earthquake movement sensations and the like, in an audience by electroacoustic coupling of relatively high intensity effects signals, *as a complex waveform including a combination of frequencies having components in at least the infrasonic frequency range,* to the theater space eliminating any need for actual physical movement of theater seats or the like to produce the effect. Additionally, the control system of the invention provides great versatility in that a single control sub-channel, which is compatible with conventional film formats, provides four digital function control signals and two variable analog control signals.

These and other features of the present invention will become apparent from the detailed description below.

DESCRIPTION OF THE DRAWINGS

FIG. 2 is a tabulation of the various combinations of the digital function control signals and the corresponding controlled functions;

FIG. 3 is a diagrammatic view of an optical sound track sound system with the special effects generation and control system of the present invention installed;

FIG. 4 is a diagrammatic view of a magnetic stripe theater sound system with the special effects system installed;

DESCRIPTION OF THE PREFERRED EMBODIMENT

Figure 1:
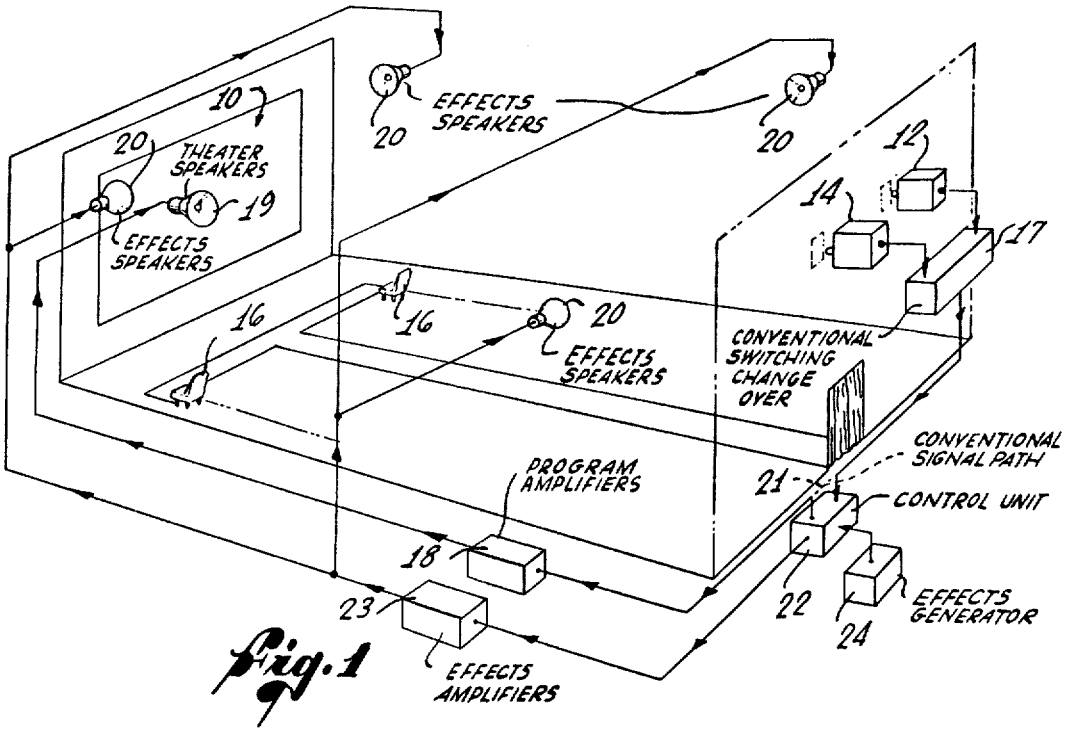
FIG. 1 is a diagrammatic view of a motion picture theater modified to incorporate the earthquake special effects generation and control system of the present invention.

Referring now to the drawings, and particularly FIG. 1 thereof, the special effects generation and control system of the present invention is utilized in the theater reproduction of a motion picture film. FIG. 1 is a diagrammatic representation of a typical motion picture theater which includes a screen 10 and right and left projectors 12 and 14 respectively for continuous showing of alternate reels of film. The audience space typically includes a plurality of rows of seats 16. In such a theater, the large majority of films shown have a single optical sound track and program signals coming from each projector 12 and 14 are fed into a conventional projector changeover unit 17. The program signal is then amplified in a program amplifier 18 and delivered to a theater speaker system 19 usually located behind the screen 10.

In utilizing the special effects generation and control system of the present invention, a plurality of additional electro-acoustic transducers, such as the four additional effects speakers 20 shown in FIG. 1, are installed around the periphery of the audience space within the theater. Also the conventional signal path 21 is interrupted and fed to a control unit 22. The modified program signal then continues on to the program amplifier 18 and an effects signal from the control unit 22 is fed to an effects amplifier 23 which provides the signals for the additional effects speakers 20. The effects signals from the control unit 22 are derived, in part, from an effects generator 24 which is connected to the control unit 22.

In the case of the presently preferred embodiment of the invention, the special effects signal from the effects generator 24 is a pseudorandom noise signal having frequency components in the sonic and infrasonic range, the generator typically producing frequencies between [15] *5* and 100 hertz. It has been found that random noise signals within this frequency range, when amplified to a relatively high intensity and applied to electro-acoustic transducers such as the speakers 20, produce a physiological and psychological sensation similar to that produced when experiencing an earthquake. The term "infrasonic" as used herein is intended to include the very low audible and subaudible frequency range, typically 40 hertz and below, usually associated with physical movement and low frequency rumbling. *The term "physical movement" as used herein, e.g., in connection with an earthquake and low frequency rumbling, is intended to refer to the type of substantial movement typically experienced in connection with high intensity phenomena, such as earthquakes, explosions and other low frequency impact and shock wave phenomena, as opposed to music, dialogue, subliminal and other relatively low level effects.*

It should be appreciated that the physiological simulation of movement is produced without any substantial actual physical movement of the audience, and that no modification of the theater is required other than installation of the effects speakers 20. Thus the special effect of movement may be generated in conventional theaters.

Figure 10:
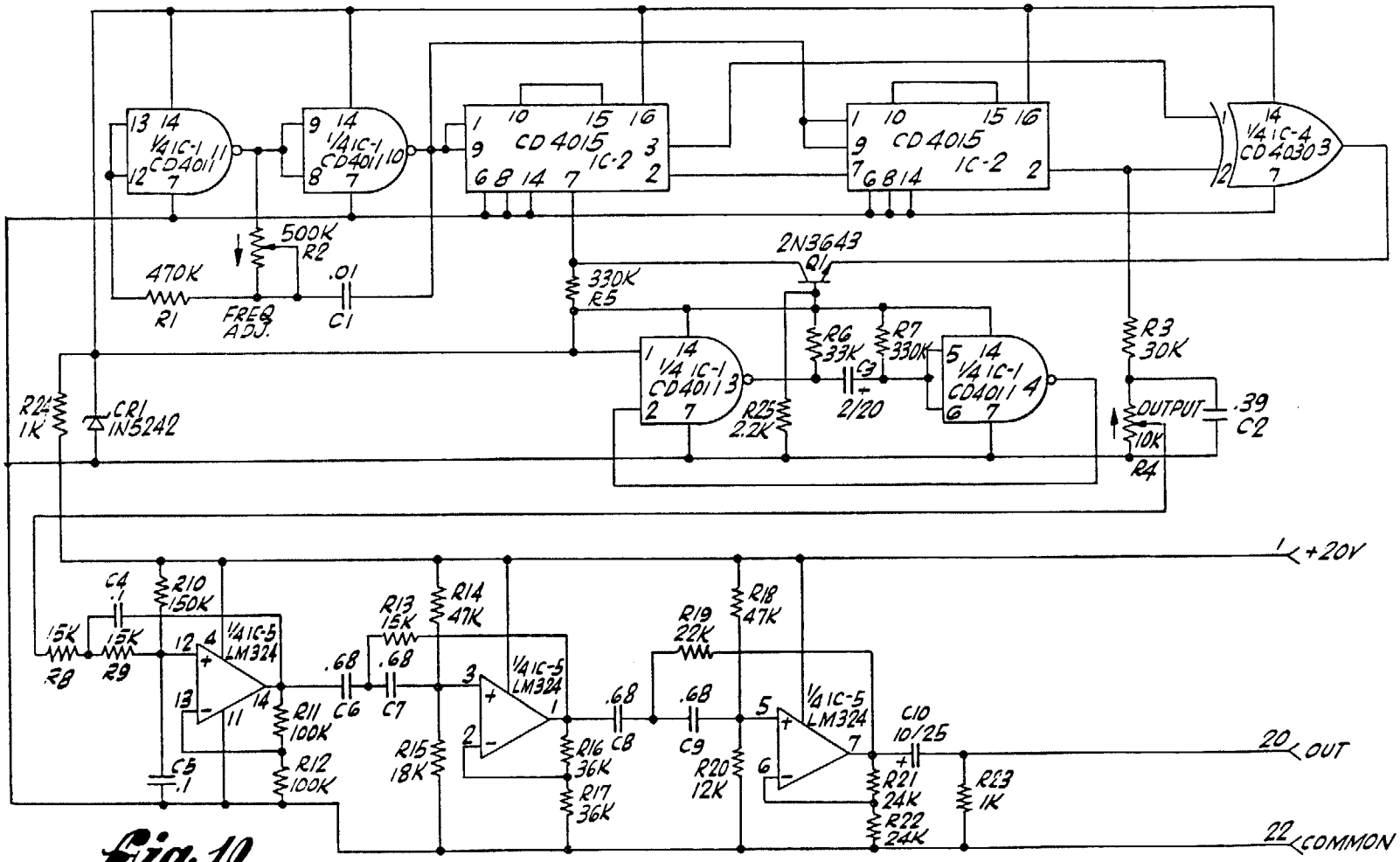
FIG. 10 is an electrical schematic diagram of one embodiment of a pseudorandom noise generator suitable for use in practicing the invention.

The circuit for the pseudorandom noise generator used in the presently preferred embodiment of the invention is a modified form of a circuit described by D. B. Keele, Jr., in the Journal of the Audio Engineering Society, Vol. 21, No. 4, Jan./Feb. 1973. By way of convenience the modified circuit is illustrated in detail in FIG. 10.

It will be appreciated that ordinary speakers and power amplifiers are not normally designed to handle essentially subaural frequencies at relatively high power. Therefore, the speakers 20 and effects power amplifiers 23 utilized in the presently preferred embodiment of the invention are specifically designed for this purpose. Speakers having the frequency and power capabilities for use in practicing the present invention are Model 189E, manufactured by Cerwin-Vega, 6945 Tujunga, North Hollywood, Calif. Amplifiers suitable for use with the present invention are Model 3000, manufactured by BGW Systems, 6030 Washington Boulevard, Culver City, Calif.

In one format of the control system, a control subchannel including two low frequency signals, is frequency multiplexed onto the normal program signal as discussed in more detail below. The two low frequency signals can be detected and recovered as the film is projected. The detected low frequency signals are processed to produce two control signals A and B which are of varying magnitude, thus providing two analog control voltages. The control signals A and B are also logically combined to produce four separate digital function control signals capable of controlling four separate parameters or functions.

For the presently preferred embodiment of the invention, the digital function control signals and their controlled parameters are tabulated in FIG. 2. For convenience, the control parameters are divided into a single parameter in a program channel and three separate parameters in an effects channel. The program channel is conventionally amplified by the program amplifiers 18 and applied to the theater speakers 19 while the effects channel is amplified by the effects amplifiers 23 and applied to the effects speakers 20 in the theater. In the program channel, a STEP GAIN control is provided so that, at selected times during the film, the gain of the signal applied to the theater speakers 19 may be increased by a predetermined level. The signal in the effects channel is selectively turned on or off as illustrated by the EFFECTS ON column. The effects channel signal may be either one or both of the program or effects generator 24 signal as determined by the digital signals in the PROGRAM GAIN and EFFECTS GAIN COLUMNS. The signal level of both is controlled by the analog signal levels of the A and B control signals, respectively.

Therefore, when both the A and B control signals are not present, the controlled parameters are such that the signal in the program channel is unaffected and the effects channel is turned off. When the A control signal alone is present, the effects channel is turned on and the program signal alone is applied to the effects channel with its amplitude controlled by the magnitude of the A control signal. When the B control signal alone is present, the effects channel is turned on and the effects signal alone is applied to the effects channel, again with its amplitude controlled by the analog signal level of the B signal. Finally, when both the A and B control signals are present, the program STEP GAIN function is activated increasing the gain of the program channel, the effects channel is turned on and a combination of the program signal and effects signal are applied to the effects channel with the amplitude of both being controlled by the analog signal levels of the A and B control signals, respectively.

Thus, the special effects generation and control system of the present invention utilizes two amplitude modulated control frequencies which are detected and processed to provide A and B analog control signals of varying level which are also logically combined to provide four digital function control signals. The format of the presently preferred embodiment of the invention provides that one of the controlled functions is a stepwise increase in the gain in the program channel and the remaining three controlled functions are the activation of the effects channel and the amplitude of the program signal and the effects generator signal in the effects channel. Therefore, by recording the A and B control signals at varying levels with the program signal on the film, a number of special effects may be cued throughout the showing of the film.

While the effects generator 24 described for use with the preferred embodiment of the invention is a very low frequency pseudorandom noise generator 24, any desired signal source may be utilized with the invention. Also, while the program signal is described as being one of the two signals which are combined in the effects channel, it should be appreciated that any signal source may be utilized so that the effects channel could include two completely different signal sources apart from the program signal source in the program channel. As a further refinement, the four logical combinations of the A and B control signals may be utilized to control four completely different functions than those described above. Thus, the control system of the present invention generally provides two analog control signals and four logically derived digital control functions which may be versatilely used in the control of many special effects which in the presently preferred embodiment is the simulation of earthquakes sensations.

FIG. 3 is a simplified block diagram of a typical and conventional optical soundtrack audio system which has been modified to include the special effects control system of the present invention. Typically, such a theater system includes the right and left projectors 12 and 14 respectively, with conventional optical soundtrack sensors 26 and 28 which produce right and left sound signals on lines 30 and 32 respectively. The lines 30 and 32 are connected to the switched terminals of a single pole, double throw changeover switch 34 which connects the right or left sound signal to a line 36. As the right and left projectors are alternated for successive film reels, the change over switch 34 is manually activated to switch between the right and left sound signals. Normally, the sound signal on line 36 is connected through a conventional signal path 21 to an input line 40 to the program power amplifiers 18 which amplify the sound signal and applies it through an output line 44 to the theater speaker 19.

To utilize the special effects control system of the present invention, the conventional signal path 21 is interrupted and the sound signal on line 36 is directed to the control unit 22. The program signal may or may not be effected by the control unit 22 and is then connected to the input line 40 to the program power amplifiers 18.

When the effects system of the invention is utilized, the input signal to the control unit 22 includes an additional control sub-channel with two low frequency signals which are detected by the control unit to perform the functions described above. In the presently preferred embodiment of the invention, the control frequencies are at 25 Hz and 35 Hz which are below the normal audio range but still sufficiently high in frequency to be processed by conventional electronic circuitry. The effects generator 24 provides a signal on an input line 50 to the control line 22 and is combined with the program signal on input line 36 to derive an effects signal on an input line 52 to effects power amplifiers 23. The amplified effects signal is applied over a line 56 to one or more effects speakers 20 as described above.

While the optical track system illustrated in FIG. 3 is the most widely used, the magnetic strip film format and projection system is utilized with special theater facilities. In the magnetic stripe system there are four separate sound channels impressed on four magnetic stripes on the film. A single channel optical track is ordinarily also utilized to provide redundant sound information for emergency situations when the magnetic sound system is inoperative. A magnetic stripe system utilizing the effects control system of the present invention is illustrated in FIG. 4. In the magnetic strip system, right and left projectors 60 and 62 respectively are also used with the magnetic sensors 64 of the right projector providing four separate program signals on a right program signal bus 68. Similarly, magnetic sensors 70 of the left projector provide four separate program signals on a left program signal bus 72.

Conventionally, the right and left optical sensors 74 and 76 provide redundant single channel audio signals on the lines 78 and 80, respectively. A mode switch 82 permits switching between the program signal buses 68 and 72 and the single channel optical sound signals on lines 78 and 80, to provide signals on the right and the left channel buses 84 and 86, respectively. The right and left sections of the mode switch 82 are mechanically ganged for common manual operation and, when switched to the optical mode, the audio signal on the optical line 78 and 80 are connected to only one of the program signal lines of the right and left channel buses 84 and 86 respectively.

To provide switching between the right and left projectors as film reels are changed, a change-over switch 88 is provided which connects the right or left channel buses 84 and 86, respectively to a signal bus 90. The bus 90 is connected through a conventional signal path 92 to an input 94 of a plurality of program power amplifiers 96 represented by the double amplifier symbol which are connected through an output bus 98 to a plurality of theater speakers 19 also represented by the double speaker symbol.

To utilize the effects system of the present invention in the magnetic stripe system illustrated in FIG. 4, the conventional signal path 92 is again interrupted and the bus 90 is connected as an input to a control unit 100. In the magnetic stripe system, the optical tracks are utilized to carry the control signals so the optical track signals on lines 78 and 80 are also connected via lines 102 and 104 as inputs to the control unit 100. Again, a signal from the effects generator 24 is connected via input line 106 to the control unit.

The control unit 100 detects and processes the control signals on the optical track, as was described above, to selectively modify the gain of the program signals on the bus 90 which are then connected as outputs from the control unit 100 to the power amplifier input bus 94. A portion of the program signals is also combined with the output of the effects generator 24 into an effects signal which is applied to a line 108 to the power amplifiers 23 which is connected to the effects speaker 20 through the output line 56, as was described above with reference to FIG. 3.

Figure 5:
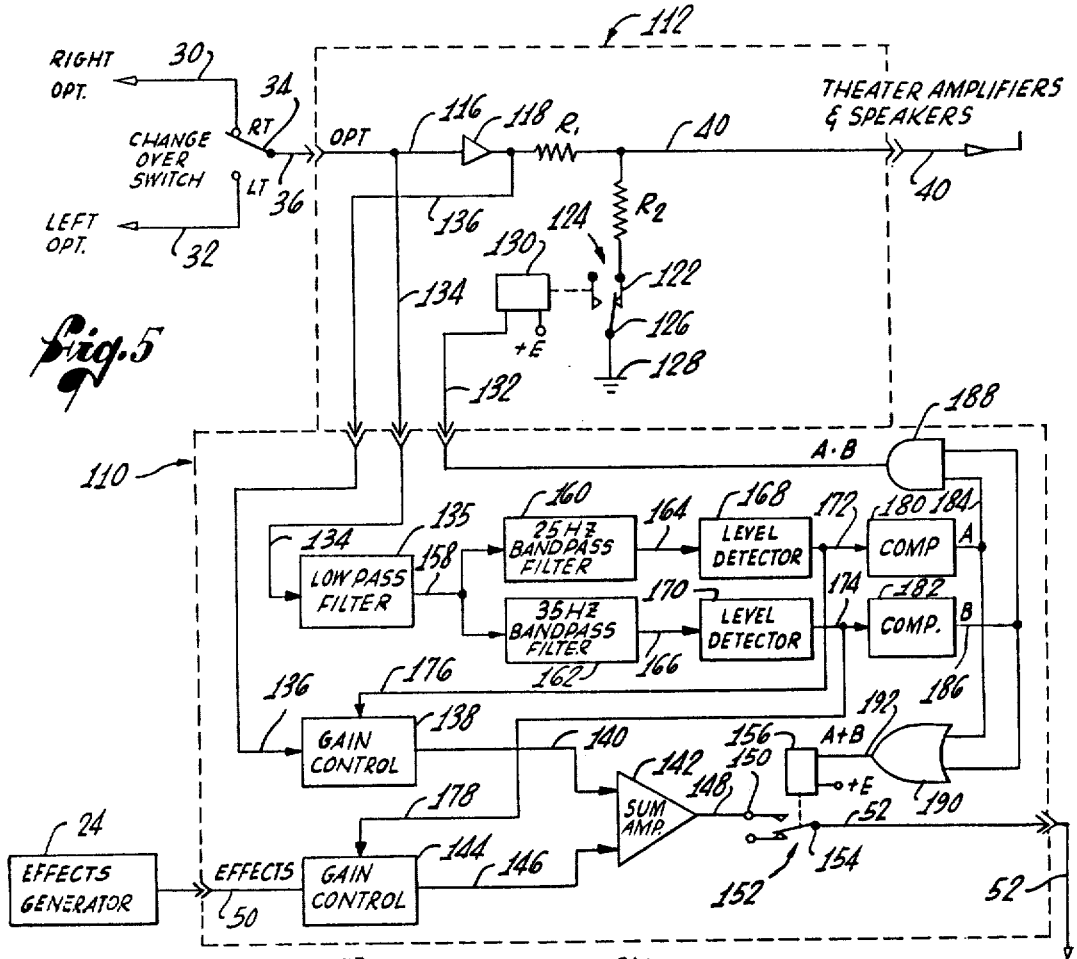
FIG. 5 is a more detailed block diagram of the switching and common control electronics sections of the special effects generation and control system of the invention for use with an optical track sound system.
Figure 6:
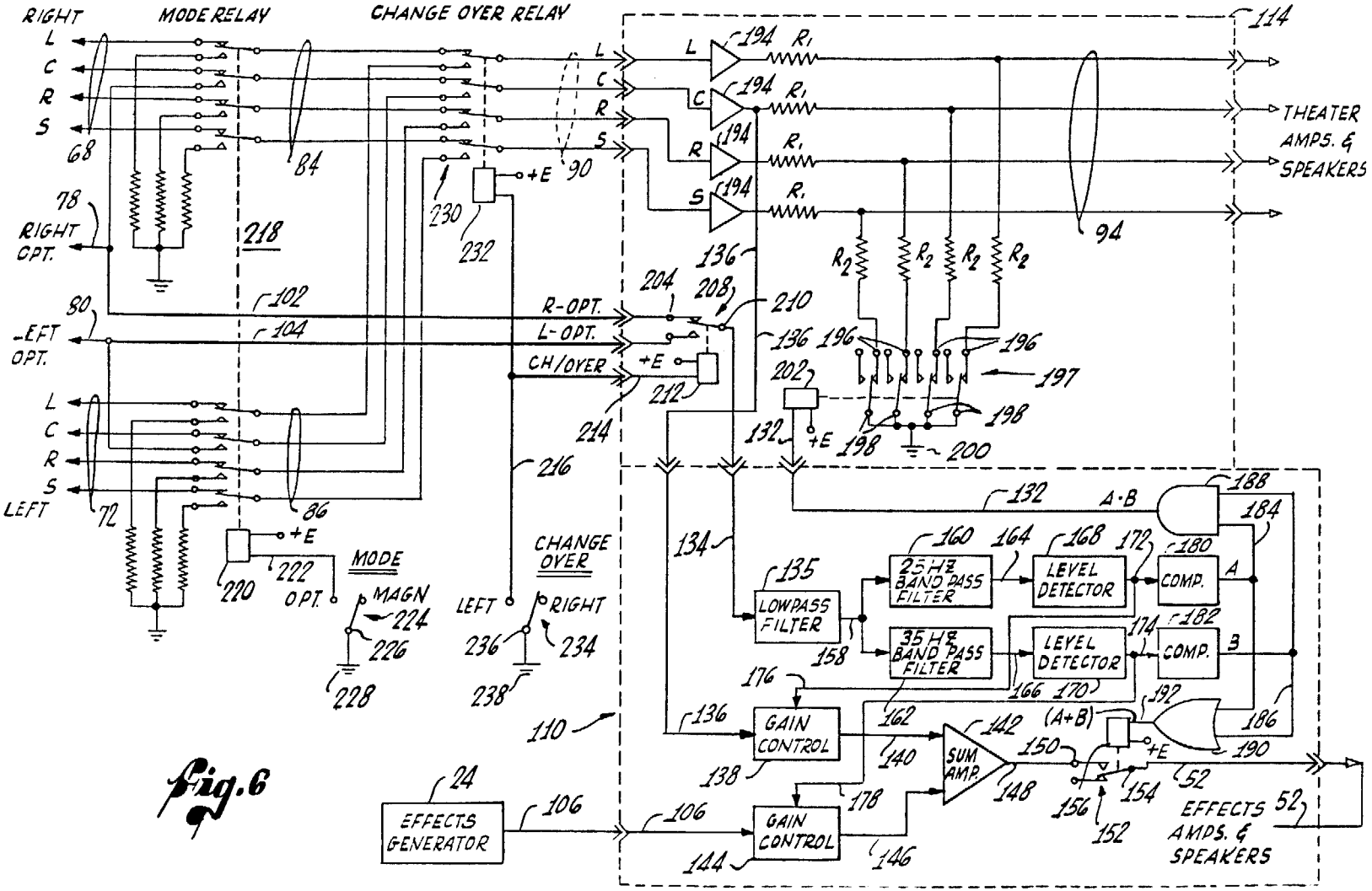
FIG. 6 is a more detailed block diagram of the switching and control electronics sections of the system for a magnetic stripe sound system.

More detailed diagrams of the interconnections between the normal program signals and the control unit for the optical track system and the magnetic stripe system are shown in FIGS. 5 and 6 respectively. Since the control signal processing is the same in both cases, the control system block diagram is shown with a dotted control electronics block 110 in each figure. All of the control electronics in block 110 is of conventional design. The switching gear for the program signal step-gain function for the alternate system are shown in a dotted optical switching block 112 and a magnetic switching block 114 in FIGS. 5 and 6, respectively. A more detailed diagram of the conventional switching gear typically present in the magnetic stripe system is shown external to the dotted blocks in the FIG. 6.

With reference to FIG. 5, the program signals on the right and left optical signal lines 30 and 32 respectively are connected through the change-over switch 34 to an input to the optical switching block 112. The optical signal is fed to an input line 116 to a conventional level equalizing amplifier 118 which serves as the input to an L-pad attenuator comprising resistors R1 and R2 with the junction of the resistors connected to input line 40 of the program power amplifier 18 illustrated in FIG. 3. The free end of resistor R2 is connected to the normally closed terminal 122 of a single pole-double throw relay 124 whose pole terminal 126 is grounded at 128. The armature coil 130 of the relay 124 has one terminal connected to a source of power (+E) and the other terminal connected to the control electronics block 110 through a line 132, the operation of which will be described below.

The optical signal on line 116 is also connected through an input line 134 to a low-pass filter 135 which is the first stage of processing for the control signals. The amplified optical signal at the output of the amplifier 118 is also connected through a line 136 to a program signal gain control 138 the output of which is connected to a line 140 to a first input to a summing amplifier 142.

Similarly, a signal from the effects generator 24 is connected through line 50 to the input to a gain-control circuit 44 and its output is connected to a second input line 146 of the summing amplifier 142. The output of the summing amplifier is connected through a line 148 to the normally open terminal 150 of a single pole-double throw relay 152 whose pole terminal 154 is connected to an output line 52 to the input of the effects power amplifier 23 as illustrated in FIG. 3. The armature coil 156 of relay 152 has one terminal connected to a source of positive potential (+E) and the other terminal connected to a logic control signal to be described below. The output of the summing amplifier 142 is a composite program and effects signal which is variable in the manner discussed above with reference to FIG. 2.

The optical signal on input line 134 to low-pass filter 135 includes both the program signal and the control signals and the low-pass filter 135 permits only the control signals to be connected through a line 158 to the inputs of 25 hertz and 35 hertz band pass filters 160 and 162, respectively. The 25 hertz and 35 hertz signals appearing at the output lines 164 and 166 of the band pass filters 160 and 162, respectively, are inputs to a pair of level detectors 168 and 170 which produce analog signal levels on lines 172 and 174, respectively, which correspond to the average signal level of the control signals.

The analog control signals on lines 172 and 174 are connected through lines 176 and 178 to the control signal inputs of the gain-controls 138 and 144, respectively. The analog signal levels on line 172 and 174 are also connected as inputs to comparators 180 and 182 which compare the input signals with fixed threshold levels to produce digital control signals A and B at their output lines 184 and 186, respectively. The digital control signals A and B on lines 184 and 186 are logically combined in an AND gate 188 to produce a further logic control signal (A·B) which is connected through line 132 to the relay 124 which controls the L-pad attenuators for the program signals. The digital control signals A and B on lines 184 and 186 respectively are also logically combined in an OR gate 190 to produce a further logic control signal (A+B) which is applied to the terminal 192 of the armature winding of relay 152 which connects the composite effects signal to the effects amplifier 23.

Referring now to FIG. 6, the control electronics in block 110 remains the same as for the optical track system illustrated in FIG. 5. The magnetic stripe switching block 114 includes four level-equalizing amplifiers 194 with their input taken from the channel signal bus 90 and their outputs feeding four L-pad attenuators comprising resistors R1 and R2 for each channel. The output of the center channel signal is connected through line 136 to the input of the gain-control 138 for the program signal.

The outputs of the L-pads are connected through the bus 94 to the program power amplifiers 96 and is described above with reference to FIG. 4. The free-ends of resistors R2 of the L-pad attenuators are connected to the normally closed terminals 196 of a four pole double throw relay 197 whose pole terminals 198 are grounded at 200. One terminal of the armature coil 202 of relay 197 is connected to a source of positive potential (+E) and the other terminal is connected through line 132 to the output of AND gate 188 which controls the step-gain function in the program channel as described above.

In the magnetic stripe system, the redundant optical track producing signals on lines 78 and 80 are connected through lines 102 and 104 as described above to the contact terminals 204 and 206 of a single pole double throw relay 208 whose pole terminal 210 connects the right or left optical track signal through line 134 to the input of the low-pass filter 135. The armature winding 212 of the relay 208 has one terminal connected to a souce of positive potential (+E) while the other terminal is connected through a line 214 through the changeover switch control line 216, the operation of which will be described below.

The right and left magnetic program buses 68 and 72 respectively are connected to normally closed terminals of four pole double throw right and left sections of a mode relay 218 with the right and left sections being mechanically ganged for common operation through an armature winding 220. The winding 220 has one terminal connected to a source of positive potential (+E) while the opposite terminal is connected through a line 222 to one side of a single pole-double throw mode switch 224 whose pole terminal 226 is grounded at 228. When the switch 224 is normally open to line 222, the magnetic program signals on the buses 68 and 72 are connected through the relay 218 to the right and left signal buses 84 and 86, respectively.

The right and left program signal buses 84 and 86, respectively, are connected to opposite terminals of a four pole double throw change-over relay 230 whose pole terminals are connected to the channel signal bus 90. An armature winding 232 of the relay 230 has one terminal connected to a source of positive potential (+E) and its other terminal connected through line 216 to one side of a single pole double throw change-over switch 234. The pole terminal 236 of switch 234 is connected to ground at 238. It can be seen that when the change-over switch 234 connects the line 216 to ground, the change-over relay is activated to switch the channel bus 90 to the left signal bus 86 and also operates the relay 208 to connect the left optical tract signal line 104 to the input line 134 to the low-pass filter 135.

Figure 8:
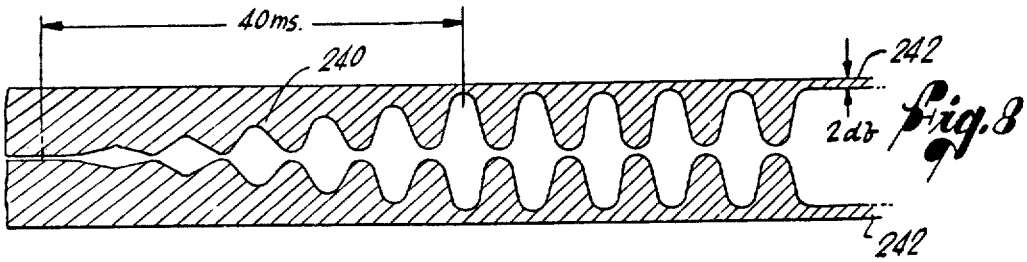
FIG. 8 is a diagram of an optical sound track illustrating the modifications needed to utilize the control system of the present invention.

In utilizing the optical track system form of the present invention, the format of the recorded optical track must be changed slightly in order to prevent inadvertent generation of control signal frequencies such as when the optical track is opened from the closed bias line to accommodate a recorded signal as illustrated in FIG. 8. Typically, the opening time constant takes approximately 28 milliseconds but, it has been found that this time constant produces a fundamental frequency in the control frequency range. The opening time constant has therefore been increased in the presently preferred embodiment to 40 milliseconds as illustrated in FIG. 8. This places the fundamental frequencies generated by opening the optical track to well below the control frequency.

In addition, it has been found that when the optical sound track is modulated to or beyond 100% during certain audio passages, the optical track may be at full open during the periods of overmodulation preventing the further addition of the control signals onto the track. For this reason, the full range excursion of the program audio signal in the optical track has been decreased by two decibels to provide a guard-band 242 on either side of the optical track upon which the control signals may be superimposed.

Figure 7:
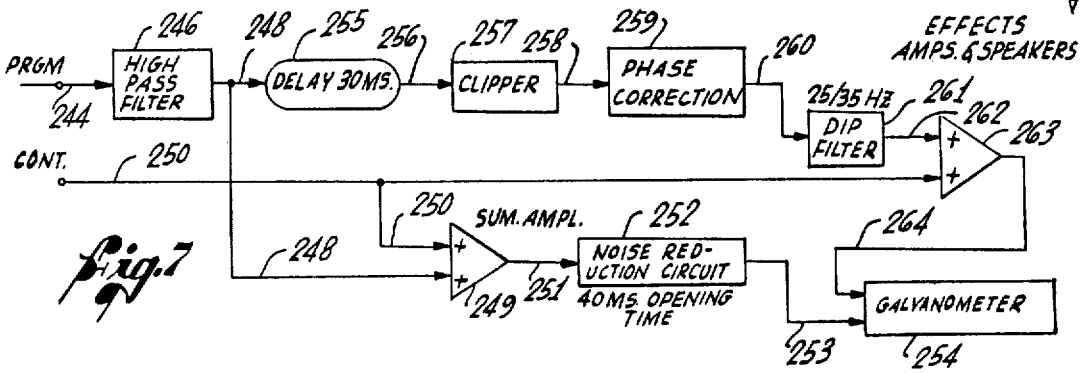
FIG. 7 is a block diagram of a typical optical sound track recording system modified for use with the special effects generation and control system of the invention.

The conventional optical track recording circuitry is modified somewhat, as illustrated in FIG. 7, in that the program signal on a line 224 is applied first to a conventional high pass filter 246 which insures that the recorded program signal does not contain any components at the control signal frequencies. The output of the high pass filter 246 on line 248 is applied to a first input of a summing amplifier 249 and a control signal on line 250 is applied to a second input to the summing amplifier. The output of the amplifier 249 on line 251 is an unmodified composite program and control signal which is applied to the control input of a conventionally designed noise reduction circuit 252 which, upon detection of the composite signal, begins a 40 millisecond opening cycle for the optical track. The noise reduction circuit 252 generates a bias signal on a line 253 which is applied to a first input to a recording galvanometer 254.

In order for the noise reduction circuit 252 to open the optical track before the audio signal is applied to the galvanometer 254, the program signal on line 248 is applied to a 30 millisecond delay line 255. The output of the delay line, on line 256, is applied to a conventionally designed clipper 257 to provide the guard-band 242 shown in FIG. 8. The output of the clipper 257, on line 258, is applied to conventional phase correction circuit 259 which compensates for any phase distortion introduced by the high pass filter 246, delay line 255 or clipper 257. The output of the phase correction circuit 259, on line 260, is then applied to a conventional dip filter 261 which blocks any control frequency components which may be generated by the clipping process.

The output of the dip filter 261, on line 262, is applied to a first input to a summing amplifier 263 and the control signals on line 250 are applied to the second input to the amplifier. The output of the amplifier 263, online 264, is the modified composite program and control signal and is applied to the program signal input of the galvanometer 254.

It should be appreciated that the source of the program and control signals, on lines 244 and 250, respectively, of FIG. 7, is conventionally a studio tape recorder and the signals have typically undergone much editing and re-recording in order to achieve a desired final result. In the re-recording process, the portions of the control signals on one magnetic track of a studio recorder may be recorded over numerous times and it has been found that, at the low control frequencies, phase differences between the control signals remaining on the track and those modified can cause undesirable abrupt signal level changes known as "drop outs".

Figure 9:
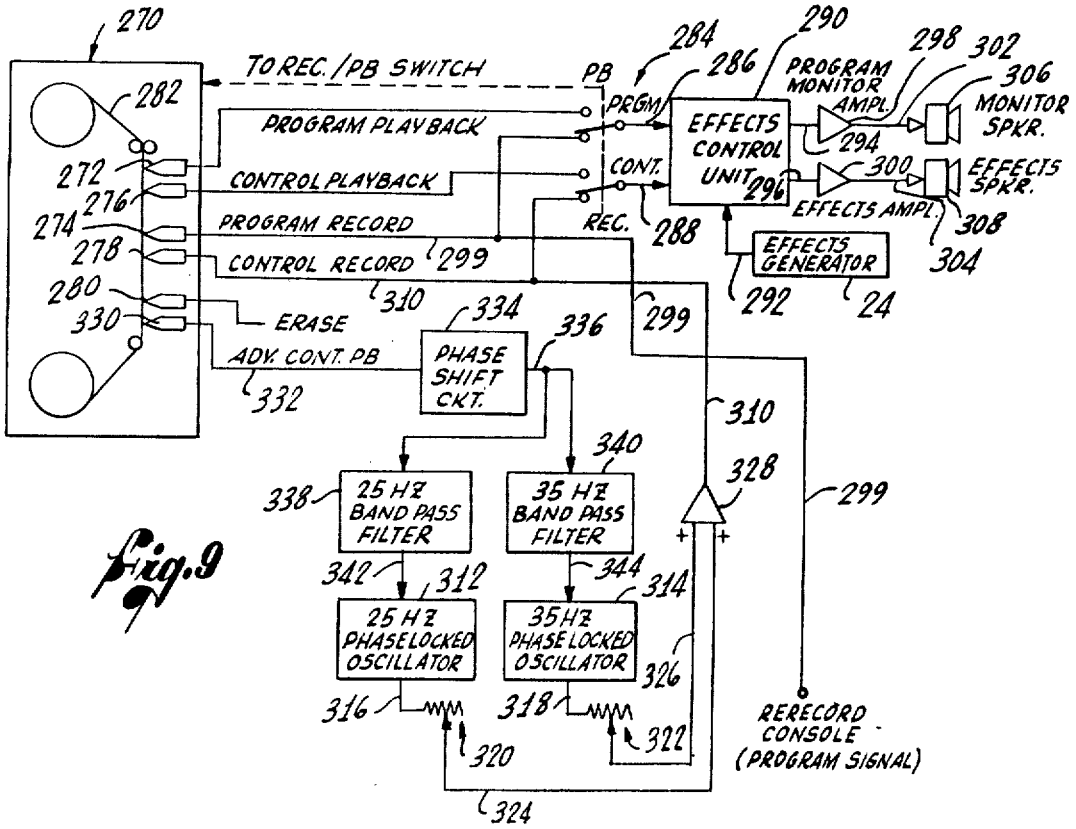
FIG. 9 is a diagrammatic block diagram of the rerecording technique used with the special effects system of the invention.

Therefore, the special effects system of the present invention includes a novel re-recording apparatus technique which insures that the phase between the control signals remaining on the track and those which are being recorded over the track remains substantially constant. FIG. 9 is a block diagram illustrating the operation of the novel apparatus.

In editing the program and control signals, a conventional studio recorder 270 with multiple tracks and separate record and playback heads is employed. In the illustrative diagram of FIG. 9, only one program playback head 272 and record head 274 are shown though it should be appreciated that numerous program tracks may be needed. One track is dedicated to the control signals and a control playback head 276 and record head 278 are included as well as an erase head 280 for each track.

Typically, while editing, the recorder is in the playback mode and a record-playback switch 284 is set to the playback position. The switch 284 is interconnected for common operation with the record-playback switch (not shown) in the recorder 270. In using the special effects control system of the invention, the program and control signals from the heads 272 and 276, respectively, are connected through switch 284 to program and control input lines 286 and 288, respectively, of an effects control unit 290 which is the same as control unit 110 of FIG. 5. The program input line 286 is connected to the gain control 138 input line 136 and the control input line 288 is connected to the low pass filter 135 input line 134. An effects signal generator 24 is connected through line 292 to the control unit 290 and program and effects signals on lines 294 and 296, respectively, are connected to a program monitor amplifier 298 and an effects amplifier 300. Output lines 302 and 304 from amplifiers 298 and 300, respectively, are connected to a monitor speaker 306 and an effects speaker 308, respectively.

The effects control unit 290 and associated equipment produce the recorded special effects for the editors and if it is desired to change the control signals, the studio recorder 270 is changed from playback to record for the control signal track. Newly generated control signals on a line 310 are connected both to the control record head 278 and to control input line 288 to the effects control unit 290 so that the results of the new control signals can be monitored. The program record head 274 may also be selectively connected through a line 299 to the program signal source.

The control signals are generated by 25 Hz and 35 Hz phase-locked oscillators 312 and 314 on lines 316 and 318, respectively, are connected to potentiometers 320 and 322 which permit control of the signal levels applied through lines 324 and 326 to inputs to a conventional summing amplifier 328 the output of which is the composite control signal on line 310.

The phase of the phase-locked oscillators 312 and 314 is controlled by the phase of the control signals already on the tape 282. Therefore, when a control signal is partially recorded over in the editing process, the newly recorded signal will substantially be a continuation of the signal remaining on the tape 282.

The recorded control signals are picked up by an advance control playback head 330 just prior to the control track being erased by the erase head 280. The recorded control signals are connected through a line 332 to a conventional adjustable phase shift circuit 334 which permits precise phase matching of the edited control signals. The output of the phase shift circuit 334 is connected through line 336 to conventional 25 Hz and 35 Hz band pass filters 338 and 340, respectively, and the filtered control signals are then connected through lines 342 and 344, to oscillators 312 and 314, respectively. The phase-locked oscillators 312 and 314, may be conventionally designed or a commercial unit such as the Signetics NE560 may be used.

Thus, the special effects, generation and control system of the present invention provides for the simulation of physiological and psychological sensations in a theater audience. In the described presently preferred embodiment, very low frequency pseudorandom noise signals having *a combination of* sonic and infrasonic components are electroacoustically coupled to the theater space at a sufficiently high intensity to cause the sensation of an earthquake in an audience without actual physical movement.

The control system of the present invention provides two analog control signals which are also logically combined to provide four function control signals to provide great versatility in controlling special effects. Additionally the control system is compatible with conventional optical track and magnetic stripe film formats. Also, the invention provides an editing technique which maintains the phase relationship of the control signals during re-recording. While a presently preferred embodiment has been described in detail, it should be appreciated that the invention is not to be limited except by the claims.

We claim:

1. A method of *realistically* simulating a specified physiological and psychological sensation *relating to physical movement associated with low frequency impact and shock wave phenomena,* in an audience viewing a visual display [in] *of such phenomena within* a theater *space*, said method comprising the steps of:

generating *a band of simultaneously present frequency spectrum components including* random frequencies and transients having *simultaneous plural* components in at least the infrasonic frequency range; and applying, in synchronism with said visual display, said frequencies and transients to acoustic transducers located [in] *within* said theater *space, to provide acoustical output including said random frequencies and transients*, at sufficient power levels to induce *in the theater audience* the specified sensation [in the audience] *of substantial physical movement corresponding to low frequency impact and shock wave phenomena.*

2. The method defined in claim 1 wherein:

said generating step includes generating components in the five to one hundred Hertz frequency range.

3. A method of *realistically* simulating the physiological and psychological sensation of earthquake movements in an audience [in] *within* a theater *space* during a motion picture performance, said method comprising the steps of:

generating electrical signals with frequencies and transients simulating an earthquake and having *simultaneous, plural* components in at least the infrasonic frequency range;

amplifying said signals to sufficient power levels for *realistically* inducing the desired sensation *of earthquake movements* in the audience; and selectively applying said amplified signals to at least one speaker system located [in] *within* said theater *space* during pre-selected portions of said motion picture performance and in synchronism with said motion [picture] *to radiate acoustical energy, including at least said simultaneous plural components, at said sufficient power levels, directly through the air to the audience.*

4. The method defined in claim 3 [including] *wherein:*

*said* generating *step includes generating* said electrical signals with a pseudorandom noise generator producing random signals in a range of approximately 5 to 100 Hertz; *and* selectively combining an audio program signal of said motion picture performance with said electrical signals to form a composite electrical signal prior to amplifying said composite signal. [; and]

[amplifying said composite signal to a relatively high level to produce acoustical energy from said speaker system at sufficient power levels to establish the sensation of earthquake movements in the audience.]

5. A method of providing for the control of special effects during the performance of a motion picture with a film format having a single audio channel in the form of an optical track, said method comprising:

limiting the audio frequency response of said audio channel to above a set cut-off frequency and frequency multiplexing into said audio channel first and second control frequencies which are below said cut-off frequency;

amplitude modulating said control frequencies in accordance with a desired effects control pattern;

detecting said control frequencies during the performance of said motion picture to produce first and second analog control signals which vary with the amplitude of said control frequencies generating first and second digital control signals when said first and second control frequencies respectively exceed a threshold amplitude;

logically combining said first and second digital control signals to produce four function control signals; and utilizing said first and second analog control signals and said four function control signals to control said special effects.

6. The method defined in claim 5 including the step of:

applying said first and second analog control signals, and said four function control signals to desired effects generators to operate and control said generators in accordance with said desired effects control pattern.

7. The method defined in claim 5 including:

generating effects electrical signals with a pseudorandom noise generator having components in the sonic and infrasonic frequency range;

directing said effects signals over a first signal path;

directing the program signals in said audio channel over a second signal path;

controlling the gain in said first and second signal paths with said first and second analog control signals respectively;

utilizing first, second and third function signals to selectively connect said first and second signal paths into a composite effects signal path, connect said first signal path to said effects signal path, connect said second signal path to said effects signal path and inhibit connection of said first and second signal paths to said composite effects signal path, respectively.

8. The method defined in claim 7 including the step of:

amplifying the signals in said effects signal path and applying them to an electro-acoustic transducer located in said theater.

9. The method defined in claim 7 including the steps of:

utilizing a fourth function signal to control a step wise increase in gain of said program signal in said audio channel before amplification thereof; and amplifying the signals in said effects signal path and applying said amplified signal to an electro-acoustic transducer located in said theater.

10. The method defined in claim 5 including the steps of:

generating effects electrical signals with a pseudorandom noise generator having components in the sonic and infrasonic frequency range;

directing said effects signals over a first signal path;

controlling the gain in said first signal path with said first analog control signal;

selectively directing the signals over said first signal path to an amplifier and electro-acoustic transducer system with a first one of said four function signals.

11. The method defined in claim 10 including the step of directing the program signal in said audio channel over a second electrical signal path and providing a selective step increase in gain in said second electrical signal path with a second one of said four function signals.

12. A method of providing for the control of special effects during the performance of a motion picture with a multiple audio channel magnetic stripe film format having an additional optical track, said method comprising:

recording on said optical track first and second control frequencies which are amplitude modulated in accordance with a desired effects control pattern;

detecting said control frequencies during the performance of said motion picture to produce first and second analog control signals which vary with the amplitude of said control frequencies generating first and second digital control signals when said first and second control frequencies respectively exceed a threshold amplitude;

logically combining said first and second digital control signals to produce four function control signals;

utilizing said first and second analog control signals and said four function control signals to control said special effects.

13. The method defined in claim 12, including the steps of:

generating effects electrical signals with a pseudorandom noise generator which produces random signals in a range of approximately 5 to 100 Hertz;

directing said effects signals over a first electrical path;

directing the program signals in said multiple audio channel over a second signal path;

controlling the gain in said first signal path and one of said audio channels in said second signal path with first and second analog control signals, respectively;

utilizing first, second and third function control signals to selectively connect said first signal path and said one of said audio channels in said second signal path into a composite effects signal path, connect said first signal path to said effects signal path, connect said one of said audio channels in said second signal path to said effects signal path and inhibit connection of said first signal path and said one of said audio channels in said second signal path to said composite effects signal path, respectively;

utilizing a fourth function control signal to control a step wise increase in gain of said program signals in said second signal path; and amplifying the signals in said effects signal path and applying it to an electro-acoustic transducer located in said theater.

14. Apparatus for simulating the physiological and pyschological sensation of earthquake movements in an audience [in] *within* a theater *space* during a motion picture performance, said apparatus comprising:

means for generating effects electrical signals including a pseudorandom noise generator which produces random signals simulating an earthquake in a range of approximately 5 to 100 Hertz *and including simultaneous, plural infrasonic components;* amplifier means for amplifying said effects signals to a relatively high level sufficient to simulate the specified sensation; and electro-acoustic transducer means connected to said amplifier means and located [in] *within* said theater *space*, said electro-acoustic transducer means being capable of reproducing said relatively high level effects signals.

15. The apparatus defined in claim 14, including:

means for selectively controlling the application of said effects signals to said amplifier means.

16. Apparatus for simulating the physiological and psychological sensation of earthquake movements in an audience in a theater during a motion picture performance, said motion picture having a film format with a single audio channel in the form of an optical track, said apparatus comprising:

means for limiting the audio frequency response of said audio channel to above a set cut-off frequency and means for frequency multiplexing into said audio channel first and second control frequencies which are below said cut-off frequency;

means for amplitude modulating said control frequencies in accordance with a desired sensation control pattern;

means for detecting said control frequencies during the performance of said motion picture and producing first and second analog control signals which vary with the amplitude of said control frequencies and means for generating first and second digital control signals whose presence depends on a threshold amplitude of said control frequencies;

means for logically combining said first and second digital control signals to produce four function control signals;

means responsive to said first and second analog control signals and said four function control signals for the generation of the sensation of earthquake movements.

17. The apparatus defined in claim 16, including:

means for generating effects electrical signals including a pseudorandom noise generator which produces random signals in a range of approximately 5 to 100 Hertz;

amplifier means for amplifying said effects signals to a relatively high level sufficient to simulate the specified sensation, said effects generating means being selectively connected to said amplifier means by said control means; and electro-acoustic transducer means connected to said amplifier means and located in said theater, said electro-acoustic transducer means being capable of reproducing said relatively high level effects signals.

18. The apparatus as defined in claim 17 including:

means for directing said effects signals over a first electrical path;

means for directing program signals in said audio channel over a second signal path; and wherein said control means controls the gain in said first and second signal paths with said first and second analog control signals, respectively;

said control means further utilizes said first second and third function control signals to selectively connect said first and second signal paths into a composite effects signal path, connect said first signal path to said effects signal path, connect said second signal path to said effects signal path and inhibit connection of said first and second signal paths to said composite effects signal path, respectively.

19. The apparatus as defined in claim 18, wherein:

said control means further utilizes a fourth function control signal to control a stepwise increase in gain of said program signal in said audio channel.

20. A method of simulating a specified physiological and psychological sensation in an audience [in] *within* a theater *space*, said method comprising the steps of:

displaying to the audience a motion picture sequence;

generating acoustical energy having *plural simultaneous* frequency components in the infrasonic frequency range, said acoustical energy being at sufficient power levels to establish the sensation of *substantial* physical movement *corresponding to low frequency impact and shock wave phenomena*; and radiating *from a source within the theater space* said acoustical energy, *including at least said plural simultaneous frequency components, at said sufficient power levels,* to the audience, in synchronism with said motion picture sequence *as said sequence depicts said phenomena*, whereby said energy is acoustically coupled to the audience *through the air* to establish the specified physiological and psychological sensation.

21. The method defined in claim 20 wherein:

said generating step includes generating components in the 5 to 100 Hertz frequency range.

22. In a system for *realistically* simulating a specified physiological and psychological sensation [in] *within* an audience *viewing a visual display* in a theater *space*, the combination comprising:

means for generating electrical signals with random frequencies and transients having *simultaneous plural* components in at least the infrasonic frequency range;

means for amplifying said signals to sufficient power levels to induce the specified sensation; and means for applying said amplified signals to electro-acoustic transducers located [in] *within* said theater *space*, whereby acoustical energy at sufficient power levels to establish the specified physiological and psychological sensation *of substantial physical movement corresponding to low frequency impact and shock wave phenomena* is acoustically coupled to the audience *through the air of the theater space.*

23. A system as defined in claim 22 wherein:

said amplified signals are selectively applied to said electro-acoustic transducers.

24. A system as defined in claim 22 wherein:

said electrical signals are generated with a pseudorandom noise generator producing random signals in the 5 to 100 Hertz frequency range.

25. In a system for providing for the control of special effects during the performance of a motion picture with a film format having a single audio channel in the form of an optical track, apparatus comprising:

means for limiting the audio frequency response of said audio channel to above a set cut-off frequency and frequency multiplexing into said audio channel first and second control frequencies which are below said cut-off frequency;

means for amplitude modulating said control frequencies in accordance with a desired effects control pattern;

means for detecting said control frequencies during the performance of said motion picture to produce first and second analog control signals which vary with the amplitude of said control frequencies generating first and second digital control signals when said first and second control frequencies respectively exceed a threshold amplitude;

means for logically combining said first and second digital control signals to produce four function control signals; and means for applying said first and second analog control signals, and said four function control signals to desired effects generators to operate and control said generators in accordance with said desired effects control pattern.

26. A method of simulating a specified physiological and psychological sensation in an audience *within a theater space*, comprising the steps of:

displaying a [motiion] *motion* picture to the audience; and generating and acoustically coupling *directly through the air of the theater space* to the audience, in synchronism with *positions of* said motion picture *relating to phenomena being simulated*, acoustical energy *containing simultaneous plural components* in at least the infrasonic frequency range at sufficient power levels to create the sensation of *substantial* physical movement *corresponding to low frequency impact and shock wave phenomena* in the audience.

27. The method defined in claim 26 wherein:

said generating step includes generating acoustical energy in the 5 to 100 Hertz frequency range.

28. Apparatus for *realistically* simulating a specified physiological and psychological sensation *relating to physical movement* in an audience, comprising:

means for displaying a motion picture *within the space* to the audience *within a theater space*; and means for generating and acoustically coupling to the audience *directly through the air of the theater space*, under the control of said motion picture *relating to phenomena being simulated*, acoustical energy *having simultaneous plural components* in at least the infrasonic frequency range at sufficient power levels to induce the specified sensation *involving physical movement* in the audience *of substantial physical movement corresponding to low frequency impact and shock wave phenomena.*

29. Apparatus as set forth in claim 28, wherein:

said acoustical energy is generated in the 5 to 100 Hertz frequency range.

*30. A method of realistically simulating a specified physiological and psychological sensation relating to physical movement in an audience within a theater space viewing a visual display, said method comprising the steps of:*

*generating a complex waveform having a combination of frequencies including simultaneous plural components in at least the infrasonic frequency range; and*

*applying, in synchronism with portions of said visual display depicting the phenomena being simulated, said combination of frequencies to acoustic transducers located within said theater space, to provide acoustical output including said combination of frequencies at sufficient power levels to induce, by direct acoustical coupling through the air, the specified sensation of substantial physical movement corresponding to low frequency impact and shock wave phenomena, in the audience within the theater space.*

*31. The method defined in claim 30 wherein:*

*said generating step includes generating components in the 5 to 100 Hertz frequency range.*

*32. A method of realistically simulating the physiological and psychological sensation of earthquake movements in an audience within a theater space during a motion picture performance, said method comprising the steps of:*

*generating electrical signals with a combination of frequencies simulating an earthquake and having simultaneous plural components in at least the infrasonic frequency range;*

*amplifying said signals to sufficient power levels for inducing the desired sensation of movements in the audience; and*

*selectively applying said amplified signals to at least one speaker system located within said theater space, during pre-selected portions of said motion picture performance and in synchronism with said motion picture, to achieve the sensation of movements by direct acoustical coupling of said combination of frequencies, at said sufficient power levels, through the air to the audience within the theater space.*

*33. A method of realistically simulating a specified physiological and psychological sensation relating to physical movement in an audience within a theater space, said method comprising the steps of:*

*displaying to the audience a motion picture sequence,*

*generating acoustical energy as a complex waveform having simultaneous plural frequency components in the infrasonic frequency range, said acoustical energy being at sufficient power levels to establish the sensation of physical movement, and*

*radiating said acoustical energy from a source within the theater space to the audience, in synchronism with said motion picture sequence, whereby said energy is acoustically coupled, at said sufficient power levels, directly through the air of the theater space to establish the specified physiological and psychological sensation of substantial physical movement corresponding to low frequency impact and shock wave phenomena.*

*34. The method defined in claim 33 wherein:*

*said generation step includes generating components in the 5 to 100 Hertz frequency range.*

*35. In a system for realistically simulating a specified physiological and psychological sensation relating to physical movement in an audience viewing a visual display within a theater space, the combination comprising:*

*means for producing electrical signals having simultaneous plural components in at least the infrasonic frequency range;*

*means for amplifying said signals to sufficient power levels to induce the specified sensation of substantial physical movement corresponding to low frequency impact and shock wave phenomena; and*

*means for applying said amplified signals to electroacoustic transducers located within said theater space, whereby acoustical energy including said simultaneous plural components, at sufficient power levels to establish the specified physiological and psychological sensation, is directly acoustically coupled through the air to the audience.*

*36. A system as defined in claim 35 wherein:*

*said electrical signals are produced in the 5 to 100 Hertz frequency range.*

*37. A method of realistically simulating a specified physiological and psychological sensation relating to physical movement in an audience within a theater space, comprising the steps of:*

*displaying a motion picture to the audience; and*

*generating and acoustically coupling directly through the air to the audience from a source within the theater space, in synchronism with said motion picture,*

*acoustical energy including a combination of frequencies having simultaneous plural components in at least the infrasonic frequency range at sufficient power levels to create the sensation in the audience of substantial physical movement corresponding to low frequency impact and shock wave phenomena.*

*38. The method defined in claim 37 wherein:*

*said generating step includes generating acoustical energy in the 5 to 100 Hertz frequency range.*

*39. Apparatus for realistically simulating a specified physiological and psychological sensation relating to physical movement in an audience within a theater space, comprising:*

*means for displaying a motion picture to the audience; and*

*means for generating and acoustically coupling directly through the air to the audience from a source with the theater space, under the control of said motion picture, acoustical energy, including a combination of frequencies having simultaneous plural components in at least the infrasonic frequency range, at sufficient power levels to induce the specified sensation in the audience of substantial physical movement corresponding to low frequency impact and shock wave phenomena.*

*40. Apparatus as set forth in claim 39 wherein:*

*said acoustical energy is generated in the 5 to 100 Hertz frequency range.*

*41. A method of realistically simulating a specified physiological and psychological sensation relating to physical movement in an audience within a theater space viewing a visual display, said method comprising the steps of:*

*generating a complex waveform having a combination of frequencies including plural simultaneous components in at least the infrasonic frequency range; and*

*applying, in synchronism with and under the direct control of said visual display, said combination of frequencies to acoustic transducers located within the theater space and surrounding the audience space, to provide acoustical output including at least said plural simultaneous components at sufficient power levels to induce the specified sensation of substantial physical movement corresponding to low frequency impact and shock wave phenomena in the audience by direct acoustical coupling through the air and without direct physical contact with the audience.*

*42. The method defined in claim 41 wherein:*

*said generating step includes generating components in the 5 to 100 Hertz frequency range.*

*43. A method of realistically simulating the physiological and phychological sensation of earthquake movements in an audience within a theater space during a motion picture performance, said method comprising the steps of:*

*generating electrical signals with a combination of frequencies simulating an earthquake and having simultaneous plural components in at least the infrasonic frequency range,*

*amplifying said signals to sufficient power levels for realistically inducing the desired sensation of substantial movements in the audience, and*

*selectively applying said amplified signals to acoustic transducers within said theater space and surrounding the audience space during pre-selected portions of said motion picture performance depicting said earthquake and in synchronism with said motion picture, to radiate acoustical energy, including at least said simultaneous plural frequency components, at said sufficient power levels, to the audience, and to achieve the sensation of substantial movements directly by acoustical coupling through the air and without direct physical contact with the audience.*

*44. The method defined in claim 43 wherein:*

*said generating step includes generating components in the 5 to 100 Hertz frequency range.*

*45. In a system for realistically simulating a specified physiological and psychological sensation relating to physical movement in an audience within a theater space, the combination comprising:*

*means for displaying a motion picture to an audience,*

*means for producing electrical signals as a complex waveform with a combination of frequencies having plural simultaneous components in at least the infrasonic frequency range;*

*means for amplifying said signals to sufficient power levels to induce the specified sensation of substantial physical movement corresponding to low frequency impact and shock wave phenomena in the audience; and*

*means for applying, in synchronism with and under the direct control of said motion picture during scenes depicting said phenomena, said amplified signals to electroacoustic transducers located within said theater space and surrounding the audience space, whereby acoustical energy including said simultaneous plural components at sufficient power levels to establish the specified physiological and psychological sensation of substantial physical movement is radiated and acoustically coupled through the air in the theater space to the audience without direct physical contact with the audience.*

*46. A system as defined in claim 45 wherein:*

*said electrical signals are produced in the 5 to 100 Hertz frequency range.*

*47. A system as defined in claim 45 wherein:*

*said electrical signals include random frequencies and transients.*

* * * * *

UNITED STATES PATENT AND TRADEMARK OFFICE

CERTIFICATE OF CORRECTION

PATENT NO. : Re. 30,278

DATED : May 20, 1980

INVENTOR(S) : Richard J. Stumpf, Waldon O. Watson, Robert J. Leonard

It is certified that error appears in the above-identified patent and that said Letters Patent are hereby corrected as shown below:

Column 4, line 30, after "3000," insert therefor --manufactured by Cerwin-Vega, and Model 750,--.

Column 6, line 20, delete "line 22" and insert therefor --unit 22--.

Column 6, line 26, delete "strip" and insert therefor --stripe--.

Column 6, line 35, delete "strip" and insert therefor --stripe--.

Column 6, line 52, delete "line" and insert therefor --lines--.

Column 7, line 60, delete "44" and insert therefor --144--.

Column 8, line 67, delete "souce" and insert therefor --source--.

Column 9, line 59, delete "224" and insert therefor --244--.

UNITED STATES PATENT AND TRADEMARK OFFICE

CERTIFICATE OF CORRECTION

PATENT NO. : Re. 30,278

DATED : May 20, 1980

INVENTOR(S) : Richard J. Stumpf, Waldon O. Watson, Robert J. Leonard

It is certified that error appears in the above-identified patent and that said Letters Patent are hereby corrected as shown below:

Column 10, line 23, add space between "on" and "line".

Column 12, line 41, "picture" should not be in brackets.

Column 16, line 27, after "sensation," delete "[in] within" and insert therefor --relating to physical movement in--.

Column 16, line 28, delete "in" and insert therefor --within--.

Column 17, line 18, delete "positions" and insert therefor --portions--.

Column 17, line 30, after "audience" insert --within a theater space--.

Column 17, line 31, after "picture" insert --relating to phenomena being simulated--.

Column 17, line 31, delete "within the space".

UNITED STATES PATENT AND TRADEMARK OFFICE

CERTIFICATE OF CORRECTION

PATENT NO. : Re. 30,278

DATED : May 20, 1980

INVENTOR(S) : Richard J. Stumpf, Waldon O. Watson, Robert J. Leonard

It is certified that error appears in the above-identified patent and that said Letters Patent are hereby corrected as shown below:

Column 17, line 32, delete "within a theater space".

Column 17, lines 35 & 36, delete "relating to phenomena being simulated".

Column 17, lines 39 & 40, delete "involving physical movement".

Column 18, line 38, delete "generation" and insert therefor --generating--.

Column 19, line 17, delete "with" and insert therefor --within--.

Signed and Sealed this

*Seventh* Day of *October 1980*

[SEAL]

*Attest:*

SIDNEY A. DIAMOND

*Attesting Officer*

*Commissioner of Patents and Trademarks*